(12) United States Patent
Jablonski et al.

(10) Patent No.: US 10,598,033 B2
(45) Date of Patent: Mar. 24, 2020

(54) VANE WITH SPOILER

(71) Applicant: Safran Aircraft Engines, Paris (FR)

(72) Inventors: Laurent Jablonski, Moissy Cramayel (FR); Pierre-Guillaume Bardin, Moissy Cramayel (FR); Philippe Gérard Edmond Joly, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 248 days.

(21) Appl. No.: 15/509,063

(22) PCT Filed: Sep. 3, 2015

(86) PCT No.: PCT/FR2015/052326
§ 371 (c)(1),
(2) Date: Mar. 6, 2017

(87) PCT Pub. No.: WO2016/038280
PCT Pub. Date: Mar. 17, 2016

(65) Prior Publication Data
US 2017/0298750 A1 Oct. 19, 2017

(30) Foreign Application Priority Data
Sep. 8, 2014 (FR) ...................................... 14 58400

(51) Int. Cl.
*F01D 9/04* (2006.01)
*F01D 5/32* (2006.01)
(Continued)

(52) U.S. Cl.
CPC ............. *F01D 9/041* (2013.01); *F01D 5/147* (2013.01); *F01D 5/3007* (2013.01); *F01D 5/323* (2013.01);
(Continued)

(58) Field of Classification Search
CPC ........ F01D 9/041; F01D 5/147; F01D 21/045; F01D 5/323; F01D 5/3007;
(Continued)

(56) References Cited

U.S. PATENT DOCUMENTS 3,871,791 A 3/1975 Guy et al.
4,265,595 A 5/1981 Bucy, Jr. et al.
(Continued)

FOREIGN PATENT DOCUMENTS

FR 2 918 409 A1 1/2009
JP 48-101603 2/1973
(Continued)

*Primary Examiner* — J Todd Newton
(74) *Attorney, Agent, or Firm* — Blank Rome LLP

(57) ABSTRACT

Relates to a vane for a turbomachine. The vane (12') has a blade (13') and a root (18') to be engaged in an axial groove in a disc of the turbomachine. The upstream end (450') of the root is connected to a radially internal end (430') of the leading edge (431') of the blade by the upstream end of a connecting zone having a discontinuity towards the downstream end, so that said radially internal end of the leading edge of the blade is situated further downstream than the upstream end of the root.

18 Claims, 4 Drawing Sheets

Figure 1:
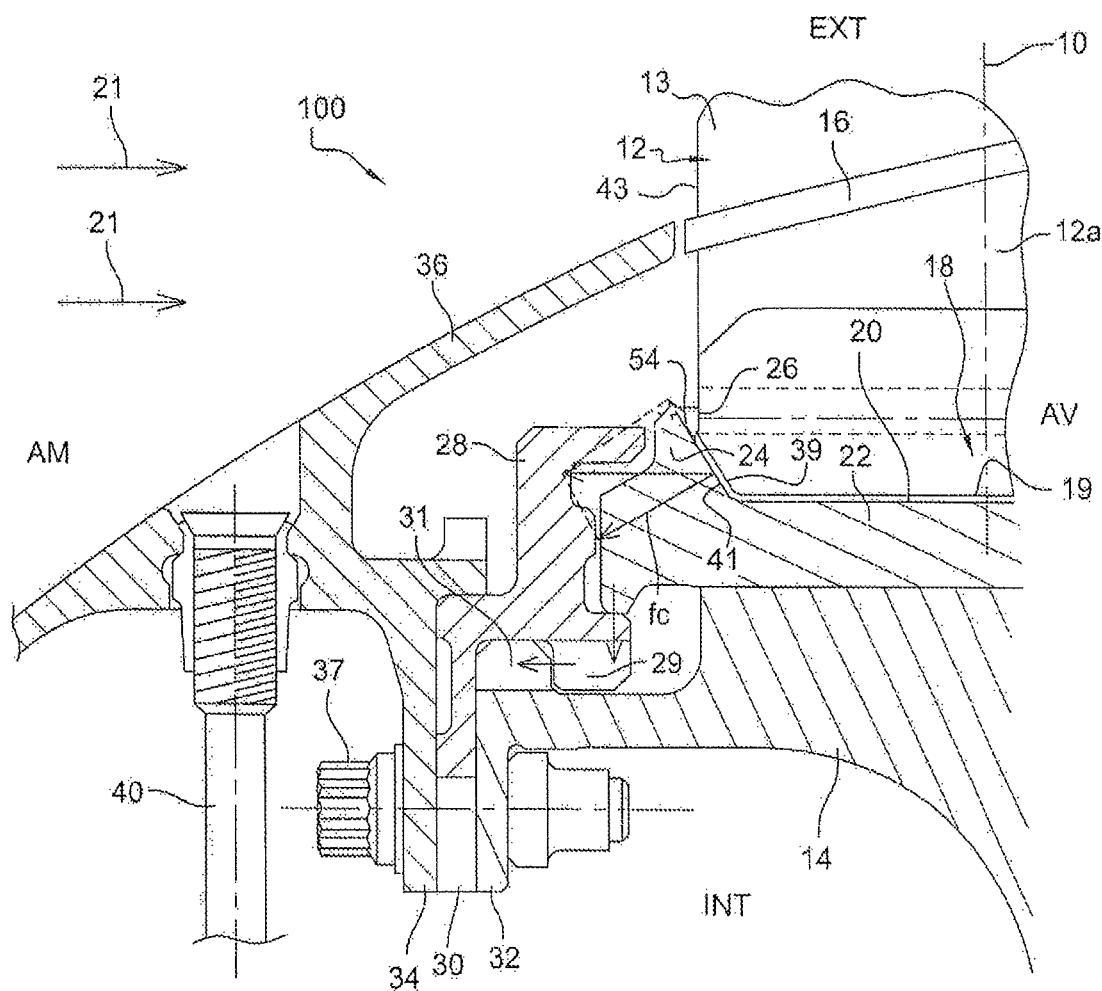

(51) Int. Cl.
*F01D 21/04* (2006.01)
*F01D 5/14* (2006.01)
*F01D 5/30* (2006.01)

(52) U.S. Cl.
CPC ........ *F01D 21/045* (2013.01); *F05D 2220/36* (2013.01); *F05D 2240/122* (2013.01); *Y02T 50/671* (2013.01); *Y02T 50/673* (2013.01)

(58) Field of Classification Search
CPC ........... F05D 2240/122; F05D 2220/36; Y02T 50/673; Y02T 50/671
USPC ..... 416/193 A, 219 A, 219 R, 220 A, 220 R, 416/221
See application file for complete search history.

(56) References Cited

U.S. PATENT DOCUMENTS

| | | | | |
|---|---|---|---|---|
| 4,405,285 A | * | 9/1983 | Surdi | F01D 5/326 411/107 |
| 4,453,890 A | | 6/1984 | Brantley | |
| 4,453,891 A | | 6/1984 | Forestier | |
| 4,470,756 A | * | 9/1984 | Rigo | F01D 5/3015 416/219 R |
| 4,872,812 A | * | 10/1989 | Hendley | F01D 5/22 416/190 |
| 6,328,533 B1 | | 12/2001 | Decker et al. | |
| 7,252,481 B2 | * | 8/2007 | Stone | F01D 5/02 416/239 |
| 7,264,447 B2 | * | 9/2007 | Ono | F01D 5/3015 416/193 A |
| 2005/0254958 A1 | | 11/2005 | Stone | |
| 2010/0329873 A1 | * | 12/2010 | Ruba | F01D 5/3015 416/220 R |
| 2011/0076148 A1 | * | 3/2011 | Fulayter | F01D 5/3015 416/204 R |
| 2011/0150657 A1 | * | 6/2011 | Millier | F01D 5/323 416/219 R |

FOREIGN PATENT DOCUMENTS

| | | |
|---|---|---|
| JP | S 55-93905 A | 7/1980 |
| JP | 58-5406 | 1/1983 |
| JP | S 58-10102 A | 1/1983 |
| JP | 2001-214893 | 8/2001 |
| JP | 2007-537385 A | 12/2007 |
| WO | WO 2009/144401 A1 | 12/2009 |

* cited by examiner

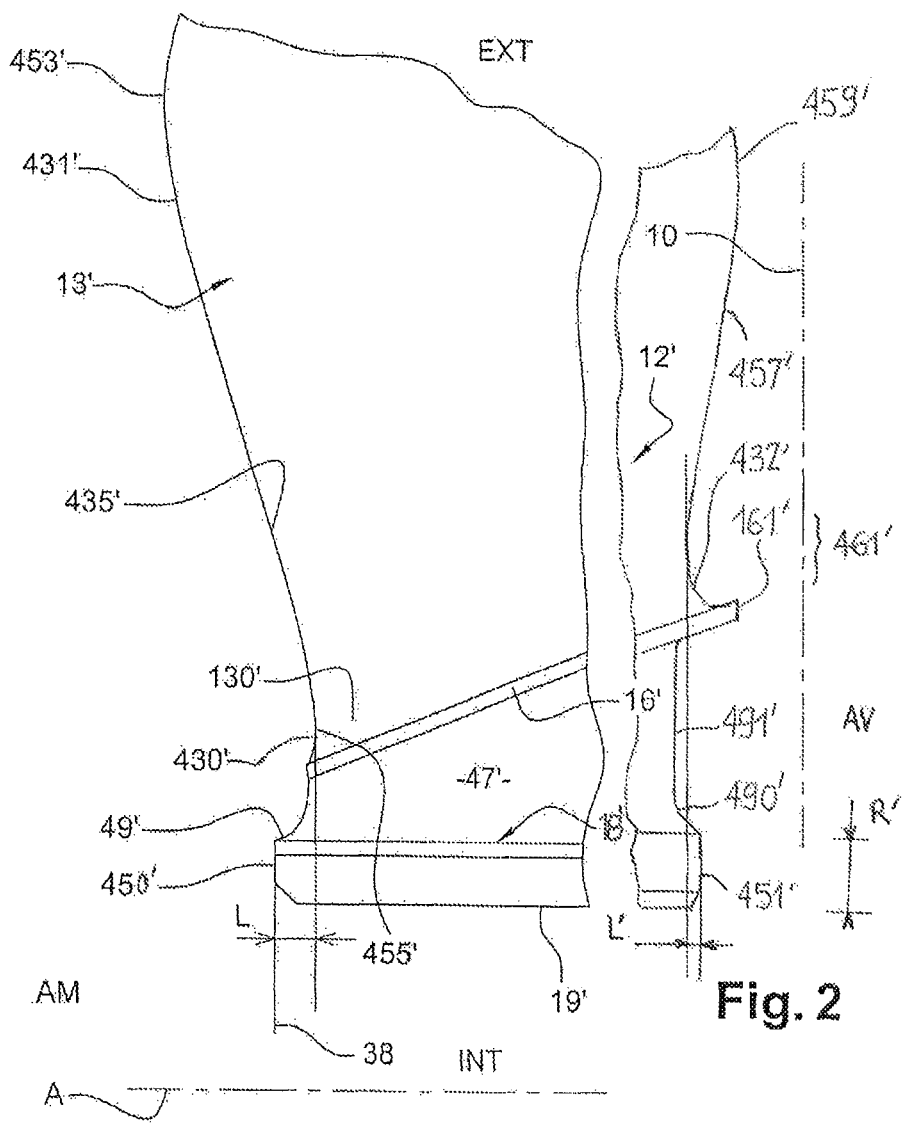
Fig. 2
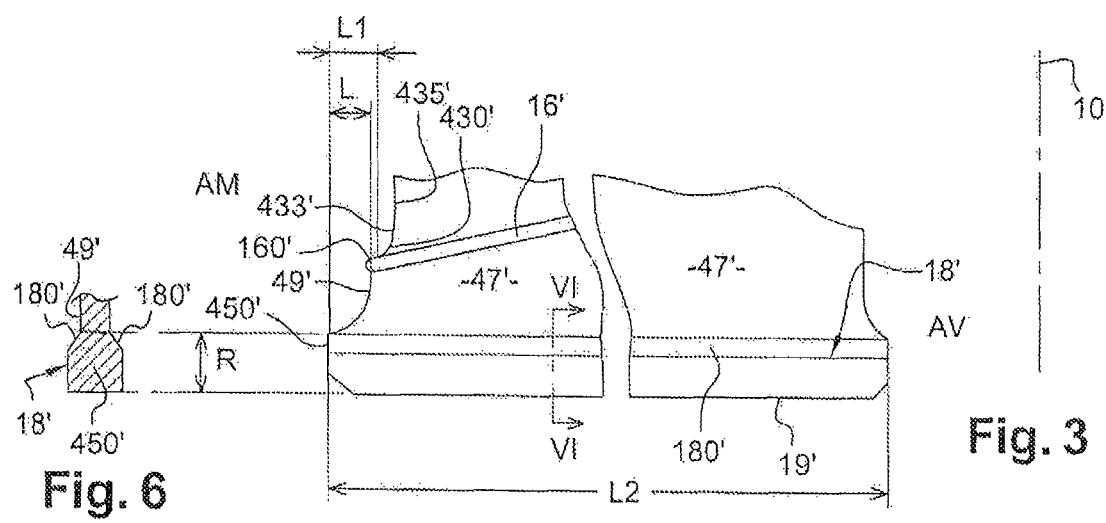
Fig. 6
Fig. 3

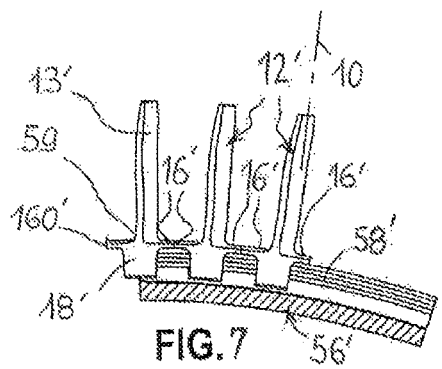
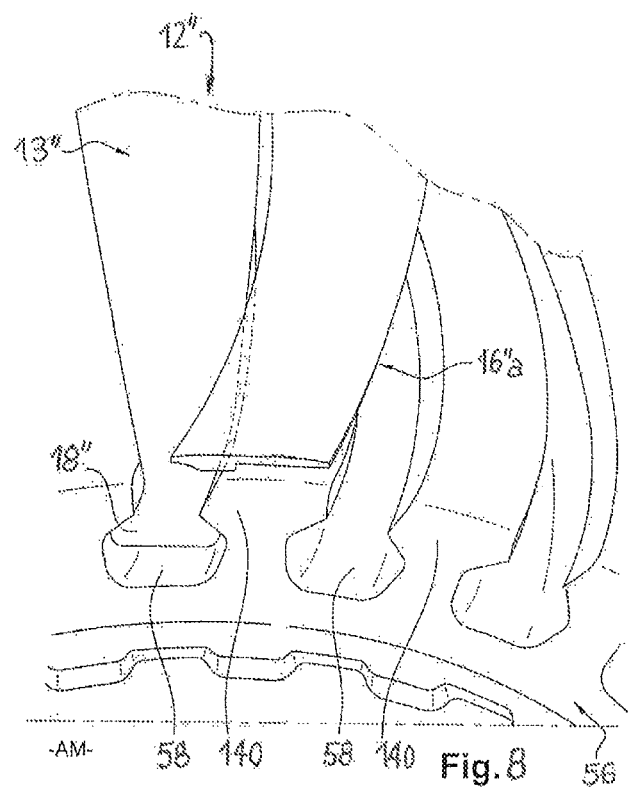

VANE WITH SPOILER

The invention relates to a vane for a turbomachine, such as in particular an aeroplane turbojet engine or turboprop engine, as well as to a fan rotor and a turbomachine thus provided.

Typically, a turbomachine rotor comprises a disc carrying at its external periphery blades having parts forming aerodynamic vanes and roots engaged in grooves in the external periphery of the disc. These grooves are substantially axial (that is to say substantially parallel to the rotation axis of the rotor) and disposed circumferentially in alternation with teeth of the disc. The blades are held radially on the disc by cooperation of shapes of their roots with the grooves, and therefore the teeth, of the disc, the roots of the blades being for example of the dovetail type.

Once the vane is in place in the corresponding groove in the disc, interposing a wedge between the root of each vane and the bottom of the groove, to immobilise the vane radially in this groove, is known. Typically, each wedge comprises at its upstream edge a spoiler that extends radially outwards and has a downstream radial face forming an axial abutment on an upstream radial face of the vane root, in order to hold the vane axially towards the upstream end. Because of high shear forces in the axial direction during the transmission of certain forces, it has been proposed to oversize the spoiler in the axial direction so that it can withstand these forces, which results in a large axial size of each spoiler and an increase in the mass of the fan rotor.

In order to compensate for the oversizing of the spoiler of a wedge in the axial direction, it is possible to trim accordingly the upstream end of the corresponding vane root. However, this solution is not satisfactory since in this case the vane root has a shorter axial dimension than that of the groove in the disc and exerts high contact forces in the lateral walls of the groove that may cause premature wear thereof.

The problem being posed in particular on a fan rotor, it is in this context that WO 2009/144401 presented a solution aimed at reducing the shear forces applied to the spoiler of the wedge, in particular in the case of loss of a fan vane.

This solution provides for the spoiler of each wedge to comprise a downstream stop face on which the upstream end of the vane root bears in the event of violent force, this downstream stop face being oblique with respect to the rotation axis of the rotor.

Thus, in this association of wedges and blades, the blades are designed to work more than previously and the stresses in them are not reduced. The flow of the stresses is not distributed between the wedge and the vane. In other words, in the distribution of the flows or stresses generated in the vane, the solution of WO 02009/144401 is a mounting in series where the stress flow passes through the vane and then through the wedge, with high stresses in the vane.

In addition, US 2011/0076148 proposes, on a turbomachine vane, to conform in a particular way especially the inter-vane internal platform that is situated radially between the root and the blade. However, this imposes precisely shape stresses that may be limiting.

Without having recourse to these options, the aim of the invention is particularly to afford a simple, effective and economical solution to the aforementioned drawback, by means of an upstream and/or downstream protrusion on the vane root that increases the axial span length.

It proposes more precisely a turbomachine vane, or a vane/platform assembly where each vane offers an upstream side and a downstream side and, in a radial direction of elongation of the vane, has:
- a blade having a leading edge along the upstream side and a trailing edge along the downstream side,
- and a root to be engaged in a groove in a disc of the turbomachine, the root being situated radially further inwards than the blade and having upstream and downstream ends, transversely to said radial elongation direction, an inter-vane internal platform (belonging or not to the vane) also extending radially between the root and the blade, so as thus to define the radially internal limit of the duct reserved for the flow of gas to be circulated in the turbomachine, characterised in that, on each vane, at least one of the upstream and downstream ends of the root is connected to a radially internal end of the leading edge, respectively of the trailing edge, of the blade by the upstream edge, respectively the downstream edge, of a connecting zone (or blade shank) radially intermediate between the root and the inter-vane internal platform, and having a downstream, respectively upstream, discontinuity so that said radially internal end of the leading edge, respectively of the trailing edge, of the blade is situated further downstream, respectively further upstream, than the upstream, respectively downstream, end of the root.

Through this or these discontinuities, a limitation in the mass of the blades, a critical point on such rotary assemblies, is aimed at.

Furthermore, through such an increased upstream and/or downstream span, the intention is to make the front (upstream) and/or the rear of the vane root work and therefore to distribute the stress flow over a larger zone, correspondingly reducing the mean local stress.

By thus axially increasing the length of the span of the root, the stress flow will be distributed in this spoiler and in the rest of the span, towards to the downstream end.

This is no longer a mounting in series as in WO 2009/144401, but a mounting in parallel; the local stresses are therefore reduced.

For information, it is stared that, on a fan vane, the span is the zone of the vane root that is in contact with the teeth of the disc that receives it, whereas the root is engaged in the groove in this disc. The axial length of the span of the vane rotor is consequently, parallel to the rotation axis of the rotor or perpendicular to the radial direction of extension of the vane, the length along which the root is in contact laterally with the teeth of the disc. The blade shank zone of a vane conventionally being the zone situated radially between the radially internal end of the vane—where the internal platforms are disposed—and the root, and therefore internally with respect to the radially internal limit defined by these internal platforms for a flow of gas to be circulated in the turbomachine, this will participate in the reduction of the stresses in the blade shank, on the upstream side.

By conforming this blade shank zone with an upstream, respectively downstream, edge with a form which is concave and/or which protrudes towards upstream, respectively is located in recess towards downstream, from the root towards the blade, not only will the stress flow be made to pass through a large cross section in order to reduce the local stress in the blade shank, but also the stress flow will be diffused as much as possible by the upstream contact zone.

Giving a radiating form (with a radius) to the concave form of the connection, along the upstream edge, respectively downstream edge, of the blade shank zone, between the internal platforms and the root, will further, through its rounded shape, promote the aforementioned diffusion of the stress flow.

It should be noted that an axial span of the root elongated towards the upstream respectively downstream side will be even more useful if, radially, towards the outside beyond a form that is first concave, the leading edge, respectively the downstream edge, of the blade has a concave form which, with respect to a straight line parallel to the radial direction of elongation of the vane and passing through the upstream end of the root, protrudes in the upstream direction, respectively is located in recess in the downstream direction, of this straight line.

If, as advised, said convex blade form is more bulging at the leading edge than at the trailing edge (L4>L5 below), the centre of gravity of the vane (at least in its main part) will then in principle be closer to the leading edge than to the trailing edge. The axial span of the elongated root will participate in the stability of the vane and will naturally prevent its weight causing it to tilt towards the upstream end at rest and rather towards the rear (downstream) when the fan rotates.

Moreover, in order to optimise both the mechanical effect sought and the weight of the vane, it will be possible to prefer for the vane to have:
- a span which, in said radial direction of elongation of the vane, flairs out towards a free (radially internal) end, with, in this direction, a distance (R) between the origin of the span and the free end,
- and with, perpendicular to said radial direction of elongation, a distance (L) between the upstream end of the root and either said radially internal end of the leading edge of the blade, or the downstream end of said discontinuity of the connection zone between the blade and the root,
- with L being less than or equal to 2R.

As for providing, still on the upstream side, for the leading edge of the blade to be connected at its radially internal end by a concave form, this will make it possible to prevent an excessively pronounced advancement upstream of the root, or even promote certain aerodynamic aspects.

By providing moreover:
- for the root of one (or each) vane to have, radially towards the inside, an axial end edge parallel to the axis of the groove in the disc that receives it, and
- for, on the upstream side, the upstream end of the root to define an upstream face that is perpendicular to the axis along which said axial end edge of the root extends, a strong axial abutment, facing to the upstream end of this root will be ensured.

In order to promote even more the limitation of mass of the vanes, it is also proposed for the upstream, respectively downstream end of the root to be connected, in a radially external fashion, to the upstream, respectively downstream edge of a radially internal part of said connection zone between the root and the inter-vane internal platform, by said discontinuity towards the downstream, respectively the upstream end so that, transversely to said radial direction, the upstream, respectively downstream end of the root is situated further upstream, respectively downstream than said upstream, respectively downstream edge of said connection zone, over its entire length.

Figure 4:
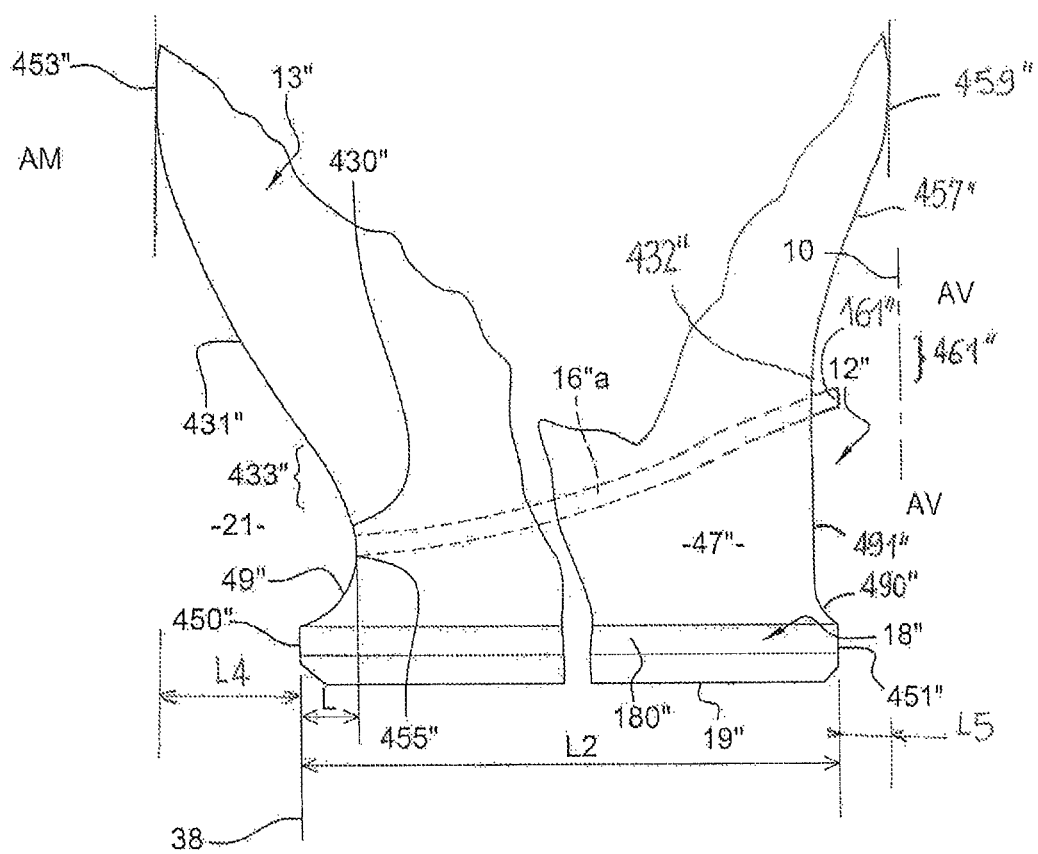
Figure 5:
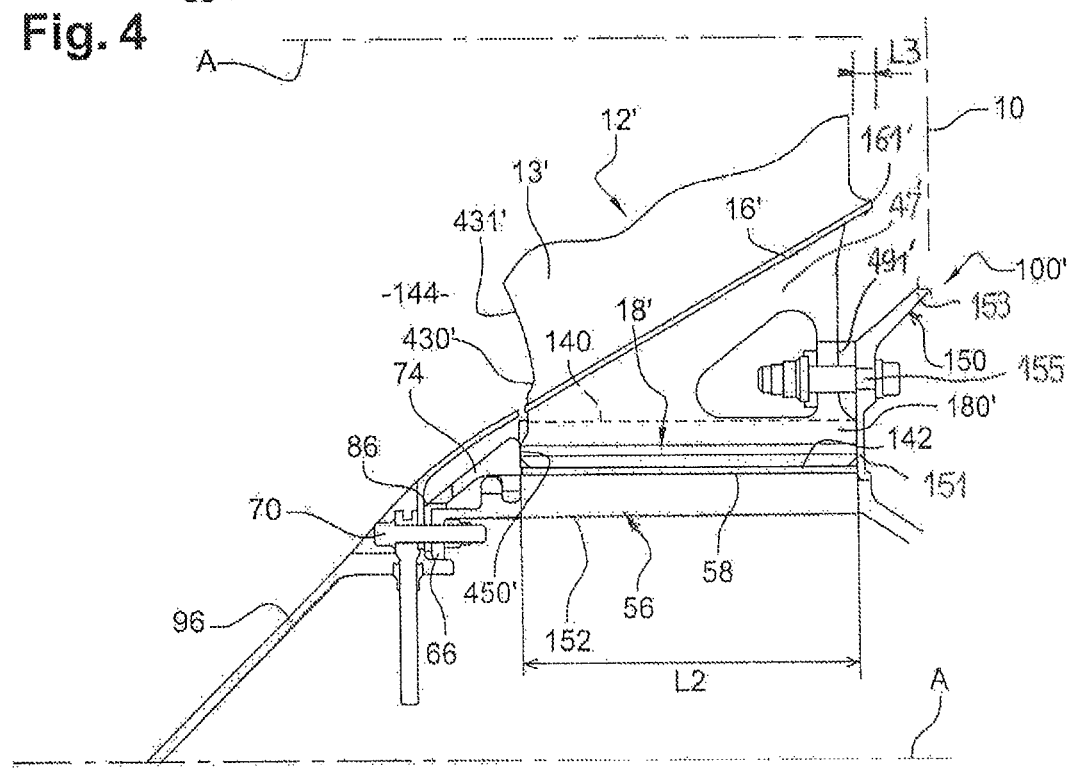

If necessary, the invention will be understood even better and other details, features and advantages thereof will emerge even more clearly from a reading of the following description given by way of non-limitative example and with reference to the accompanying drawings, in which:

FIG. 1 is a partial schematic view in axial section (apart from the vane which is seen from the side) of a fan motor of a turbomachine according to the prior art;

FIG. 2 is a partial schematic side view of a vane of a fan rotor of a turbomachine according to the present invention, FIG. 3 is a schematic view to a larger scale of a part of FIG. 2, FIG. 4 is a partial schematic side view of an alternative of a vane according to the present invention, FIG. 5 is a partial schematic view in axial section (apart from the vane which is seen from the side) of a fan rotor provided with vanes each like the one in FIG. 4, FIG. 6 is a local section along the line VI-VI in FIG. 3, and FIGS. 7, 8 show schematically two types of vane and two possible assemblies.

In relation to FIG. 1, the vanes 12, only one of which is shown, correspond to a solution of the prior art. Thus the vane 12' in FIGS. 2, 3 could be substituted for each vane 12 and the other parts presented of the rotor could be reused in order to implement the invention.

On the fan rotor 100, the vanes 12 are carried by a disc 14 and inter-vane platforms 16 are interposed between these vanes. The disc 14 is fixed at the upstream end of a shaft, not shown, of the turbomachine.

In this case, the inter-vane platforms 16, which are to be disposed, circumferentially (around the axis A), end to end with internal platforms of adjacent vanes, so that they define together a radially internal and circumferential limit for a gas flow (duct 21) to be circulated in the turbomachine, are each in a single piece with the rest of the vane (blade, blade shank and root) that carries them; however, it could be a case of attached (not integral) platforms extending laterally as far as the immediate vicinity of each lateral face, such as the one at 12a.

Each fan vane 12 comprises a blade 13 connected at its radially internal end to a root 18 that is engaged in a substantially axial groove 20 with a shape complementary to the disc 14 making it possible to hold this vane radially on the disc.

The expressions:
- radial and axial refer respectively to the direction 10 of extension of the vane and to the orientation of the groove 20 where the root 18 is engaged (parallel to the rotation axis A of the rotor), it being specified that the root has, radially towards the inside) an internal axial end edge 19 (or radially internal free end) to be engaged parallel to the axis of the groove 20,
- internal and external (see respectively EXT and INT, FIGS. 1, 2) refer to the position along the direction 10 of extension of the vane; the root 18 is towards the inside, the blade 13 towards the outside,
- upstream and downstream (see respectively AM and AV, FIGS. 1-3) refer to the position along the axial direction A.

Thus, on the rotor, the roots 18 are engaged axially and held radially in grooves, or alveoli, on the external periphery of the disc, these grooves being disposed in alternation with teeth on the disc.

A wedge 22 is interposed between the root 18 of each vane and the bottom of the corresponding groove 20 in the disc in order to radially immobilise the vane in the groove. Each wedge 22 is formed by an elongate bar carrying at its upstream end a spoiler 24 that extends radially outwards.

The spoiler 24 is, in the mounting position shown in FIG. 1, in axial abutment on a radial face 26 of the upstream end of the vane root 18 in order to hold the vane axially in the upstream direction on the disc 14.

An annular plate 28 is fixed coaxially to the upstream end of the disc 14, the external periphery of this plate 28 extending upstream of the spoilers of the wedges 22. The plate 28 is held on the disc 14 by dog teeth 29, 31, the plate 28 in addition comprising at its internal periphery an annular flange 30 that is interposed between an upstream annular flange 32 of the disc 14 and an internal annular flange 34 of a cap 36 arranged upstream of the disc 14 and of the vanes 12. The flanges 30, 32 and 34 comprise axial orifices for the passage of screws 37 or the like for clamping the flanges together. Towards its radially internal end, the radial face 26 of the root 18 is bevelled and therefore comprises an oblique upstream end face 39 designed to bear against a substantially parallel oblique face 41 of the spoiler 24 of the wedge, in particular in the case of loss or rupture of one of the fan vanes 12.

The face 39, which extends obliquely with respect to the axis A of the fan, therefore connects the upstream radial face 26 of the root 18 to its radially internal axial edge 19.

Suitable this may be, this embodiment affords a solution in particular in the case of loss or rupture of a vane. However, the invention aims first of all to take into account the management of the stress flows in normal operation and therefore without loss of a vane, when these stress flows are overall along the axis 10, and directed from the vane towards the disc. The objective is to reduce them, in particular in the connection zone between the blade and the root.

It is particularly for this purpose that the solutions in FIGS. 2 to 4 propose, in accordance with the invention, a vane 12', respectively 12", in which the upstream end 450', respectively 450", of the root 18', respectively 18", is connected to a radially internal end 430', respectively 430", of the leading edge of the blade 13' respectively 13", by the upstream edge of a connecting zone having a discontinuity towards downstream 49', 49" so that said radially internal end of the leading edge 431', respectively 431", of the blade is situated further downstream than the upstream end (450', 450") of the root.

Thus when, as in FIG. 5, the vane is engaged in the groove 58 of the disc 56, an excess length L of the span forming a spoiler, or a protrusion, is available, axially (parallel to the axis A) for distribution of the stress flows, in particular with the rotor in normal operation.

For an explanation of the proposal, L2 marks, in FIGS. 3 to 5, the span length of the vane, that is to say the length which, perpendicular to the elongation direction 10, and parallel to the axis A, extends between the upstream and downstream ends (respectively 450" and 451" in FIG. 4) of the vane root in question, this root being, over the whole of this length and once mounted, contained inside the groove 58 of the disc 56 as illustrated in FIG. 5 for the vane 12'.

Hereinafter, the solution in FIGS. 2, 3 is referred to, but the solution in FIG. 4 is also relevant. It suffices to replace the prime (') with the double prime ("). Precisely, along the axis A, the upstream end 450' of the spoiler is situated further upstream than is the upstream end 160' of the lateral internal platforms 16', this upstream end 160' corresponding to that of the blade shank zone 47' at the point where it is connected upstream with the base of the blade, in the case of platforms 16'.

It will have been understood that this upstream position is assessed along the rotation axis A of the rotor, or parallel to the rectilinear axial end edge 19' which, as before, the root 18' of the vane 12' has (radially towards the inside) and is to be engaged in the axial groove in the relevant disc.

What was provided for above upstream could be so downstream, or upstream and downstream in order further to elongate the span length L2.

Thus, for the downstream, provision has been made in the same figures for the downstream end 451', 451" of the root to be connected to a radially internal end of the trailing edge 457', 457" of the blade by the downstream edge of a connecting zone (or blade shank; 472, 47") radially intermediate between the root and the inter-vane internal platform 16', 16" (whether or not it be in a single piece with the vane), having an upstream discontinuity 490', 490", so that said radially internal end of said trailing edge (432' in FIG. 2) of the blade is situated further upstream than the downstream end of the root (451' in FIG. 2).

By thus making the stress flow pass through a large cross section, the local stress in the blade shank will therefore be reduced.

In this regard, to facilitate the diffusion of the aforementioned forces to the end (upstream; AM) of the span, FIGS. 2 and 3 show the advantage of providing for the blade shank zone 47' situated radially between the internal platforms 16' and the root 18' (and therefore internally with respect to the air duct delimited by these platforms, once the vane 12' is mounted), to be connected to the root, at its upstream end, by a concave form given to the discontinuity 49' or 49".

Providing that such a concave form is radiating (defined by a radius) will facilitate even further the diffusion of the forces, by avoiding corners.

For good axial abutment, it is recommended that, at the end furthermost upstream, the root has an upstream end face 450' oriented perpendicular to the axis along which the axial end edge 19' extends.

Moreover, in order to assist the balance of the vanes, it is recommended that, upstream and downstream, the most bulging zones of the blade respectively at the leading edge and at the trailing edge (453', 453" and 459', 459" respectively; FIGS. 2, 4) are situated respectively upstream and downstream of said respectively upstream and downstream ends of the root: axial distance L4 and L5 in FIG. 4.

For balance of the assembly, it is recommended that L4>L5.

And to limit further the mass of the vanes, the downstream end 451', 451" of the root will be connected favourably, in a radially external fashion, to the downstream edge 491', 491" of the radially internal part of the blade shank zone 47', 47" by a discontinuity 490', 490" towards the upstream end.

Thus, transversely to said radial direction 10 of the vane, here along the axis A, the downstream end 451', 451" of the root will be situated further downstream than said downstream edge 491', 491" to which this downstream end is connected.

Once again for the general balance of the vane and efficient guidance of the air flow by the internal platforms, such as 16', 16", it is even proposed that the downstream end 161', 161" of each of these platforms be situated further downstream than said downstream end of the root, along the axis A, and therefore transversely to said radial direction of elongation 10 of the relevant vane (see distance L3, FIG. 5).

FIG. 7 shows the arrangement of the platforms 16' of the vanes 12' the roots 18' of which are held, around the axis A, in a circumferential groove 58" of the disc 56'. Each platform 16', in a single piece with the blade, extends essentially in an axial and circumferential direction, all around the blade, transversely to the axis 10 in question. A radius 59 defines a connecting part between the blade 13' and the platform 16' concerned, having an external progressive transition face with a concave profile. Thus mounted, the platforms come into abutment against each other in pairs through their circumferential end face 160'.

In FIG. 4, the vane is without a single-piece internal platform. Each internal platform (one of which 16"*a* is shown by transparency) is attached, disposed laterally between two circumferentially successive blades and fixed to the disc so that the duct 21 is further limited internally.

Thus, in this version, there is, on the vane, radially, a direct connection between the blade shank 47" and the blade.

In FIG. 8, it can be seen better that the platforms are attached: the one 16' shown schematically extends circumferentially between a pair of vanes 12", only one of which is shown, with its root 18" held in one of the grooves 58 in the disc 56 formed between two circumferentially successive ribs 140 around the axis A.

This does not prevent the leading edge 431" of the blade being connected at its radially internal end 430" by a concave form 433".

In FIG. 3, this is even clearer: the corresponding concave form 433' is even recessed towards the downstream end with respect to the axial position of the concave form 49' that the upstream edge of the connecting zone between the blade and the root (axial distance L1) has.

In this regard, and whether or not it is a case of a vane with an integral internal platform, it will therefore be advantageous (in particular for the mass, but also for balance, if the forms created are different upstream and downstream), for, at the upstream end and/or at the downstream end, the upstream respectively downstream end of the root to be connected, radially externally, to the upstream respectively downstream edge of a radially internal part of said connection zone 47', 47" between the root and the inter-vane internal platform (16' or 16"), by said downstream respectively upstream discontinuity, so that, transversely to said radial direction 10, the upstream respectively downstream end of the root is situated further upstream respectively further downstream than the upstream respectively downstream edge of said connection zone, and this (radially) over its entire length of this zone (and therefore from the connection to the root as far as level with the internal platform).

Another common point between the versions illustrated: radially towards the outside (axis 10) and beyond the concave form 433', 433", the leading edge 431', 431" of the blade has a convex form 435', 435".

This is seen more clearly in FIG. 2.

On the other hand, on the version in FIG. 4 of a vane without an integrated platform, the concave form 461' that preferably, in the version with integrated platform (FIG. 2), the connection to the radially internal end of the trailing edge of the blade with the platform has, is not found at 461". Radially, between the platform 16"*a* and the most bulging (towards the downstream end) zone 459" of the blade at the trailing edge, the form of this trailing edge remains concave despite everything.

Combining these successively concave and then convex forms along the leading edge of the blade, with a connection to the downstream discontinuity (49', 49") of the concave form (433', 433"), will make it possible to manage finely the balance to be found between the excess length L of the axial span (parallel to the axis A), the axial position of the centre of gravity of the vane (important in particular for its static and dynamic balances, with rotor in rotation) and the requirements as to aerodynamic performance.

In FIGS. 3 and 6 in particular, it will be noted again that, in relation to this point, it is advised:

that, in said radial direction 10 of elongation of the vane concerned, its span zone flares out towards a free end (such as 19' in FIG. 3), with, in this direction, a distance R between the origin of the span (180', 180" in FIGS. 3, 4) and the free end (19' or 19"), and with, perpendicular to said radial elongation direction 10, a distance L between the upstream end of the root and either said radially internal end (455', 455" in FIGS. 2, 4) of the leading edge of the blade, or the downstream end of the discontinuity (49', 49") of said connection zone between the blade and the root (see FIG. 3), where L is less than or equal to 2R.

The same consideration and therefore compliance with the above ratio can usefully be provided downstream, with then L less than or equal to 2R'. The dimension R' (height of the root downstream, along the axis 10) will (FIG. 3) or not (see FIG. 2) be equal to R. A height R'>R will assist a favourable rear abutment of the root (as shown in schematically in FIG. 5).

Either of the vanes 12', 12" could be installed on the rotor 100' shown in FIG. 5.

The disc 56 is arranged therein around the axis A of the turbomachine, and is rotated by a downstream drive shaft (not shown).

Vanes, including the one 12' already presented, between which the inter-vane platforms 16' are interposed, are carried by the disc 56.

The root 18' of each vane is engaged in a substantially axial groove 58 of the disc 56, formed between two teeth or ribs 140 on the disc, and making it possible to radially hold this vane on the disc 56.

The rotor 100' is also equipped with means for axial holding of the vanes on the disc towards the upstream end. These comprise a plate 74 mounted in the annular groove of the disc 56 and forming an axial abutment of the roots of the vanes. The plate 74 is rotationally immobilised by means of an annulus 86 comprising a cylindrical part delimited by internal and external cylindrical faces. The cylindrical part of the annulus is in axial abutment through the outside against a flange 66 of the disc. The flange 66 comprises, evenly distributed over its entire circumference, axial holes for the passage of screws 70. The flange 74 is rotationally immobilised by abutment of its solid parts against projections on the annulus. A cap 96, for example made from aluminium and conical in shape, is fixed to the disc.

The fan vanes 12' are held axially in the grooves 58 in the disc 56 by the aforementioned means 70, 74, 86, 96 and therefore arranged upstream of the vanes.

A wedge 142 is interposed between the root 18' of each vane and the bottom of the corresponding groove 58 in the disc 56 in order to immobilise the vane radially on the disc 56.

The inter-vane platforms 16' still form a wall that delimits internally the duct 144 of the air flow entering the turbomachine, and comprise means that cooperate with corresponding means provided on the disc 56, between the grooves 58, to fix the platforms on the disc.

The low-pressure compressor, LP, 150 is here arranged downstream of the fan disc 56, and directly in abutment against the downstream ends of the vane roots 18' and the ribs 140 of the disc, there therefore does not exist any radial depth stress of the ribs related to the engagement of downstream hooks. The axial abutment of the LP compressor 150 is here achieved by a radial lug 151 on the upstream end of the upstream annular arm 153 of a downstream labyrinth annulus. An axial fixing, typically bolted, 155, can supplement the above abutment, radially just outside, between the radial lug 151 and the blade shank zone, here 47' (see FIG. 5).

The profile of the internal wall 152 of the disc 56 may be frustoconical, flaring out towards the downstream end.

The invention claimed is:

1. A vane for a turbomachine, the vane comprising an upstream side and a downstream side and comprising, in a radial direction of elongation of the vane:
a blade having a leading edge along the upstream side and a trailing edge along the downstream side,
a root to be engaged in a groove in a disc of the turbomachine, the root being situated radially further inwards than the vane and having upstream and downstream ends, transversely to the radial elongation direction, and
an inter-vane internal platform also situated radially between the root and the blade,
wherein the upstream end of the root is connected to a radially internal end of the leading edge of the blade by an upstream edge of a connecting zone radially intermediate between the root and the inter-vane internal platform, said upstream edge having a discontinuity defining a recess towards downstream, so that said radially internal end of the leading edge of the blade is situated further downstream than the upstream end of the root, and/or
wherein the downstream end of the root is connected to a radially internal end of the trailing edge of the blade by a downstream edge, of a connecting zone radially intermediate between the root and the inter-vane internal platform, said downstream edge having a discontinuity defining a recess towards upstream, so that said radially internal end of the trailing edge of the blade is situated further upstream than the downstream end of the root.

2. A vane according to claim 1, in which the recess has a form which is concave.

3. A vane according to claim 1, in which the upstream edge of the connecting zone between the blade and the root has a form that has a radius.

4. A vane according to claim 1, in which the leading edge of the blade is connected at a radially internal end by a concave form.

5. A vane according to claim 4, in which, radially beyond the concave form of the leading edge, of the blade has a convex form.

6. A vane according to claim 5, in which the convex form of the leading edge is more bulging than that of the trailing edge.

7. The vane according to claim 4, in which, radially beyond the concave form of the trailing edge of the blade has a convex form.

8. A vane according to claim 1, having:
a span which, in said radial direction of elongation of the vane, flares out towards a free end,
in said radial direction, a first distance between an origin of the span and the free end, and,
perpendicular to said radial direction of elongation, a second distance between the upstream end of the root and either said radially internal end of the leading edge of the blade, or the downstream end of the recess of said connection zone between the blade and the root,
the second distance being less than or equal to twice the first distance.

9. A vane according to claim 1, wherein the upstream end of the root is connected, radially externally, to the upstream edge, of a radially internal part of said connection zone between the root and the inter-vane internal platform, by said downstream discontinuity so that, transversely to said radial direction, the upstream end of the root is situated further upstream than said upstream edge of said connecting zone, over an entire length thereof.

10. A fan rotor for a turbomachine, the rotor comprising a disc having a rotation axis and having, at an external periphery thereof, substantially axial grooves in which vane roots of a plurality of vanes according to claim 1 of disposed.

11. The fan rotor according to claim 10, wherein the internal platform of each vane has an upstream end and includes a first and a second part respectively extending laterally on either side of the blade, so that the first and second parts define together a radially internal limit for a flow of gas to be circulated in the turbomachine, the upstream end of the root of each vane being situated further upstream than is the upstream end of each internal platform.

12. The rotor according to claim 10 in which:
the root of each of said vanes has, radially an axial end edge parallel to an axis of the groove that receives it, and
at the upstream side, the upstream end of the root defines an upstream end face that is perpendicular to an axis along which said axial end edge of the root extends.

13. An aircraft engine, comprising a plurality of vanes according to claim 1.

14. The vane according to claim 1, in which the trailing edge of the blade is connected at a radially internal end by a concave form.

15. The vane according to claim 1, wherein the downstream end of the root is connected, radially externally, to the downstream edge of a radially internal part of said connection zone between the root and the inter-vane internal platform, by said upstream discontinuity so that, transversely to said radial direction, the downstream end of the root is situated further downstream than said downstream edge of said connecting zone, over an entire length thereof.

16. The vane according to claim 1, wherein, in said radial direction, from the upstream edge of the connecting zone towards a free end of the blade, the leading edge of the blade has a concave form followed by a convex form.

17. An assembly comprising:
turbomachine vanes, each vane having an upstream side and downstream side and having, in a radial direction of elongation of the vane:
a blade having a leading edge along the upstream side and a trailing edge along the downstream side, and
a root adapted to be engaged in a groove of a turbomachine disc, the root being situated radially further inwards than the blade and having an upstream end, and
inter-vane internal platforms each interposed between two successive vanes, radially facing an intermediate level between the root and the blade of the vanes,
wherein, on each vane, the upstream end of the root is connected to a radially internal end of the leading edge of the blade by an upstream edge of a connecting zone radially intermediate between the root and the inter-vane internal platform, said upstream edge having a discontinuity defining a recess towards downstream end so that said radially internal end of the leading edge of the blade is situated further downstream than the upstream end of the root.

18. An assembly comprising:
turbomachine vanes, each vane having an upstream side and downstream side and having, in a radial direction of elongation of the vane:
  a blade having a leading edge along the upstream side and a trailing edge along the downstream side, and
  a root to be engaged in a groove in a disc of the turbomachine, the root being situated radially further inwards than the blade and having an upstream end, and
inter-vane internal platforms each interposed between two successive vanes, radially facing an intermediate level between the root and the blade of the vanes,
wherein, on each vane, the downstream end of the root is connected to a radially internal end of the trailing edge of the blade by a downstream edge of a connecting zone radially intermediate between the root and the inter-vane internal platform, said downstream edge having a discontinuity defining a recess towards upstream, so that said radially internal end of the trailing edge of the blade is situated further upstream than the downstream end of the root.

* * * * *